April 25, 1950          J. E. STEWART          2,505,369
BEVERAGE DISPENSER

Filed Dec. 20, 1943          5 Sheets-Sheet 1

INVENTOR.
JAMES E. STEWART
BY
J. A. Grier
ATTORNEY.

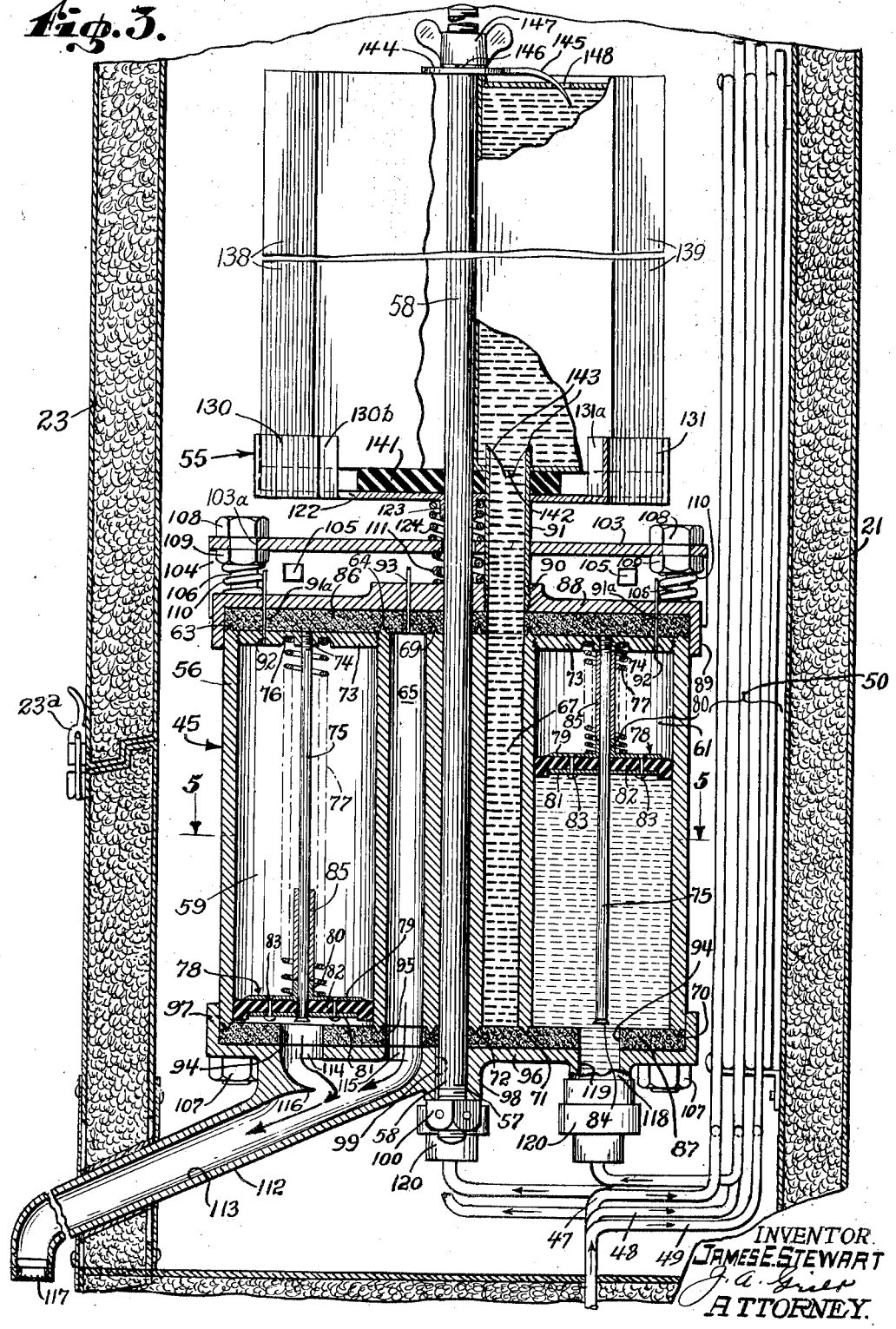

April 25, 1950  J. E. STEWART  2,505,369
BEVERAGE DISPENSER
Filed Dec. 20, 1943  5 Sheets-Sheet 3
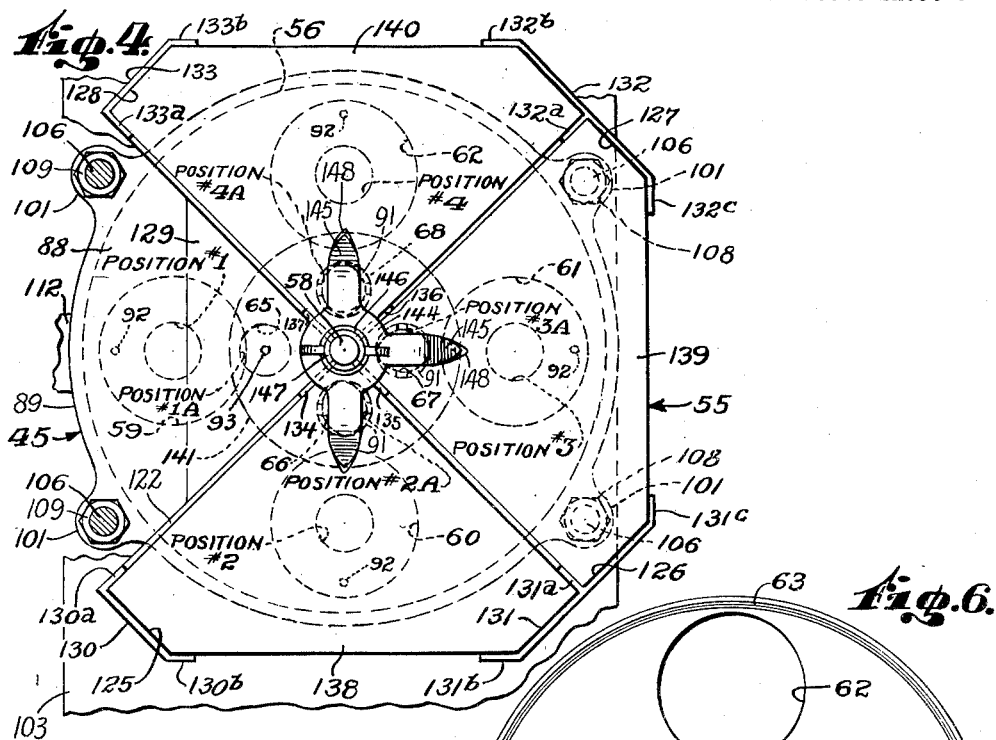
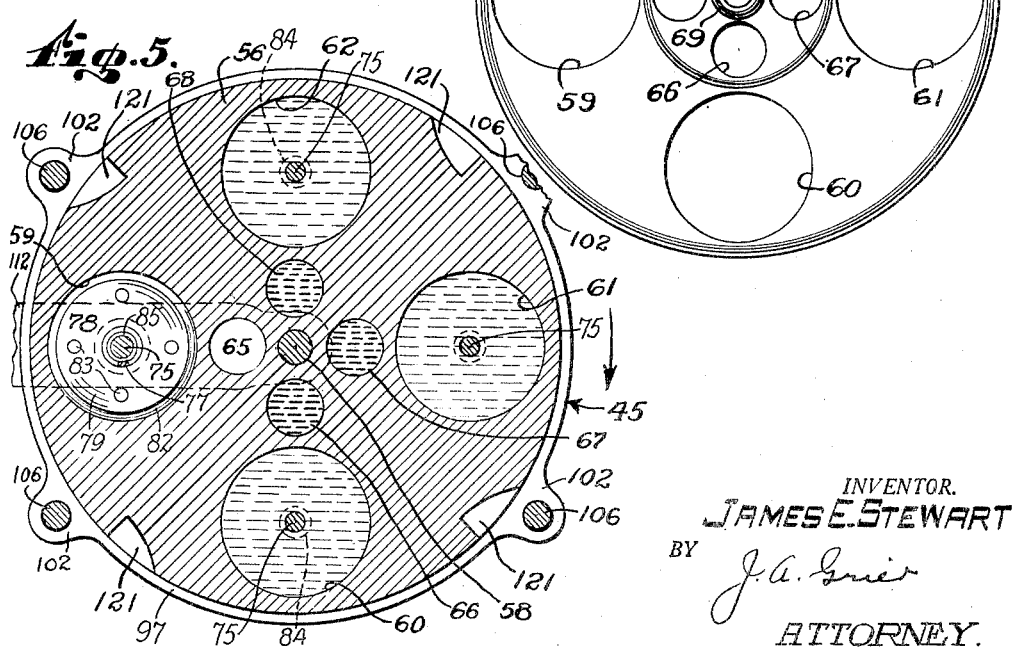
INVENTOR.
JAMES E. STEWART
BY J. A. Grier
ATTORNEY.

April 25, 1950     J. E. STEWART     2,505,369
BEVERAGE DISPENSER
Filed Dec. 20, 1943     5 Sheets-Sheet 4
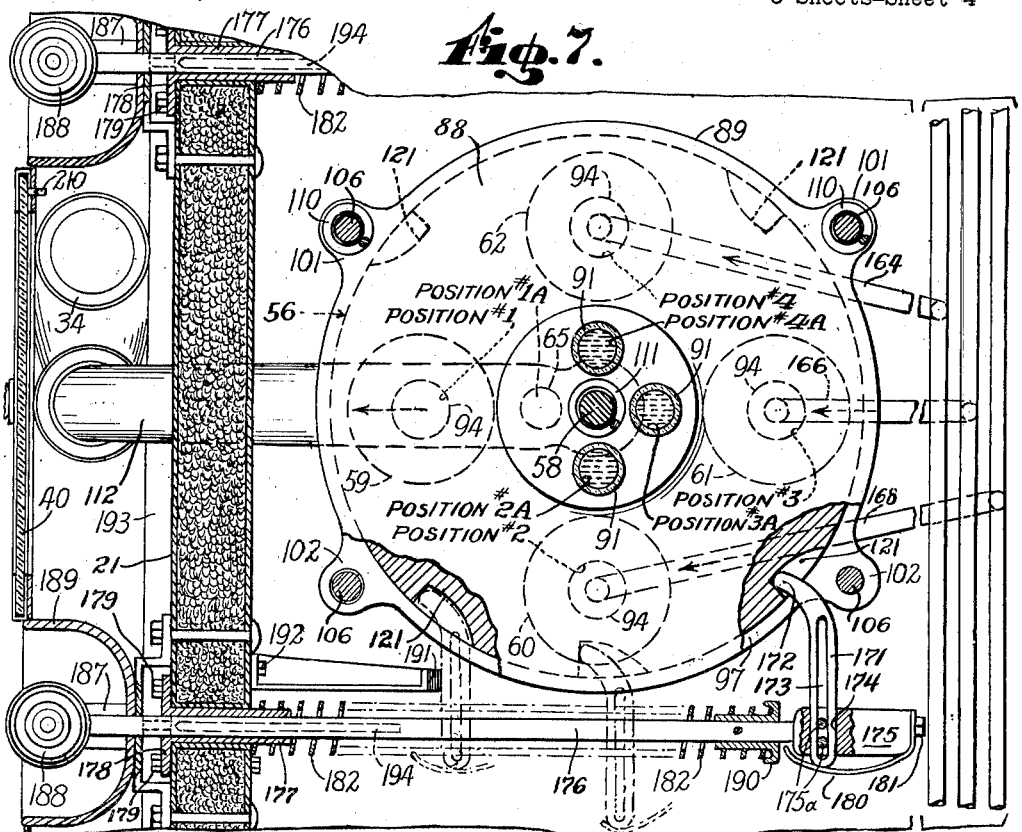
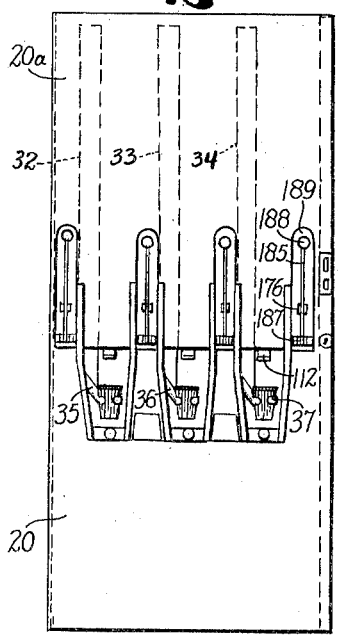
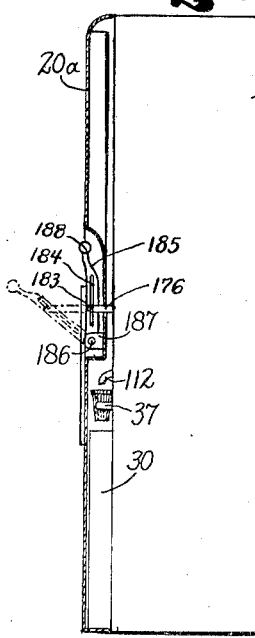
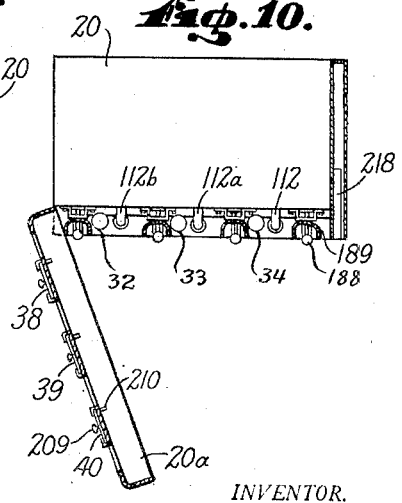
INVENTOR.
JAMES E. STEWART
BY
ATTORNEY.

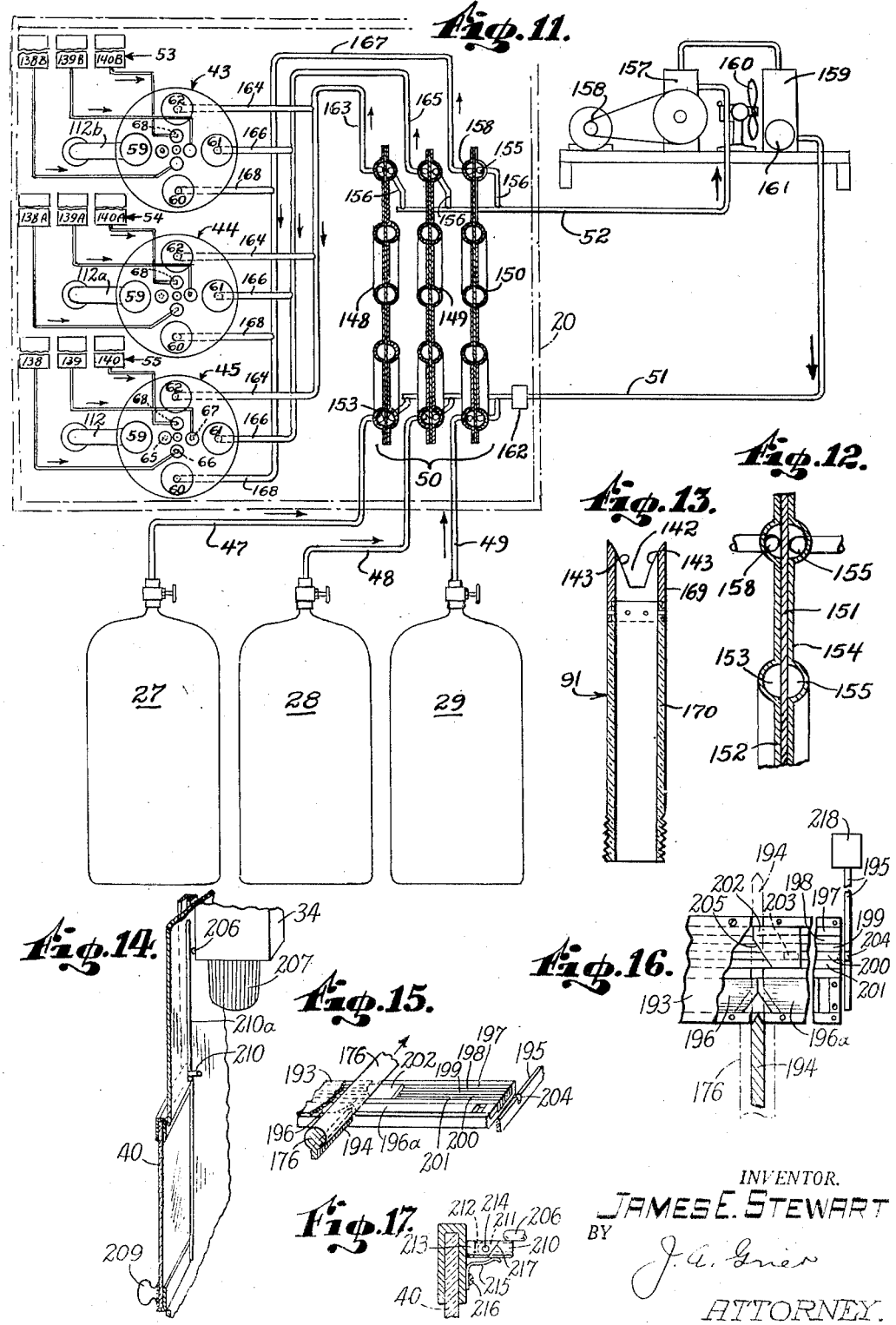

Patented Apr. 25, 1950

2,505,369

UNITED STATES PATENT OFFICE 2,505,369

BEVERAGE DISPENSER

James E. Stewart, Rye, N. Y., assignor, by mesne assignments, to Stewart Products Corporation, a corporation of Delaware Application December 20, 1943, Serial No. 514,889

20 Claims. (Cl. 225—21)

This invention relates to improvements in dispensers for beverages and other liquids, and has for an object the provision of dispensing apparatus for delivering measured quantities of liquid under pressure into a container.

Another object of the invention is the provision of dispensing apparatus adapted to receive sealed containers of liquid, adapted to break the seals and to deliver the liquid therefrom in equal measured quantities.

A further object of the invention is the provision, in dispensing apparatus, of a member having a measuring cavity formed therein, said member being movable from a filling position, where its cavity may become filled with a liquid, to a discharge position, where the liquid in said cavity may discharge into a suitable container.

Another object of the invention is the provision, in dispensing apparatus, of a member having a measuring cavity of one size formed therein and a second measuring cavity formed therein, smaller than said first cavity, said member being movable from a filling position (where the first cavity is in communication with a source of carbonated water, and the second cavity is in communication with a source of flavoring syrup) to a second position, where both said cavities may deliver the water and the syrup through a discharge opening into a drinking cup or glass.

A further object of the invention is the provision in dispensing apparatus, of a cylindrical member movable about its vertical axis and having a plurality of measuring cylinders formed therein and a second plurality of smaller measuring cylinders also formed therein, said first cylinders being equally spaced apart and said smaller cylinders each being positioned in definite relation to one of said first cylinders, means for moving the cylindrical member in steps, each step being equal to the spaces between the first mentioned measuring cylinders, a discharge port in communication with one of said first cylinders and with its companion smaller cylinder and inlet ports in communication with the others, a source of carbonated water communicating with one or several of said inlet ports so that the cylinder or cylinders in communication therewith may become filled, filler ports in communication with one or more of said smaller cylinders, with the exception of the one communicating with said discharge port, and a source of syrup connected to said filler ports, whereby the cylinders and their companion smaller (syrup) cylinders, after being filled, may be advanced to communicate with the discharge port, where their contents may mix while flowing out into a drinking vessel.

Yet another object of the invention is the provision of apparatus adapted to receive one or more containers of syrup, said containers being shaped to fit a predetermined compartment in said apparatus, and the provision of means forming a leak-proof discharge connection through the bottom wall of the container, and means forming an air vent in the upper wall of the container, said means acting to pierce the said walls as and while the container is being secured in the compartment.

Other objects and advantages of the invention will be apparent to those skilled in the art.

For the purpose of illustrating the invention, I show a dispensing device employing a rotatable cylindrical member having four main cylinders, each having a companion auxiliary cylinder. The cylindrical member may be advanced in steps of one-fourth of a revolution each. A discharge port has a spout which delivers the drink to a cup or container. Both a main cylinder and its companion auxiliary communicate with the discharge port, and the other three main cylinders communicate with filler ports which may be connected to a source of carbonated water under pressure— this may be a single source connected to all three filler ports, or individual sources may be provided for each filler port.

For the sake of clarity I will call the discharge position No. 1, the position of the main cylinder, to be next moved to the discharge position No. 2; the position of the next main cylinder (which will follow No. 2) No. 3; and the position of the next main cylinder, No. 4, the latter is, of course, the position which each cylinder leaving the discharge position is moved to.

Assuming that charged tanks or water are connected to the filler ports in positions 2, 3 and 4, the cylinders communicating with these ports will all immediately fill with charged water (the auxiliary cylinders will also fill with syrup as will hereinafter be described). Now, the cylindrical member is advanced one step to bring the cylinder in No. 2 position to the No. 1 or discharge position to be dispensed. The cylinder that was in No. 3 position is moved to No. 2 position, but it will not take in any charged water in this position because it is already full. The cylinder that was in No. 4 position is moved to the No. 3 position, but it will not take in any charged water because it is also already full. The cylinder that was in the No. 1 position is moved to the No. 4 position, and since it is completely empty, it fills with charged water. This process repeats for each drink dispensed, and in time the charged tank connected to the No. 4 position becomes empty. When this happens, the cylinders become filled in the No. 3 position until the charged tank connected there becomes exhausted—then the cylinders will only fill in the No. 2 position.

The service man comes along and replaces the exhausted tanks in the No. 3 and No. 4 positions and immediately the cylinders in the No. 3 and No. 4 positions are filled and as the dispensing continues the cylinders fill at the No. 4 position until the new tank is exhausted, then in the No. 3 position, etc.

The auxiliary cylinders fill by gravity at the same time as their main cylinders from individual containers of syrup. The container in the No. 4 position empties first, then the No. 3, and the No. 2; and as soon as replenished the No. 4 takes over and repeats.

I provide a spring loaded piston in each cylinder which facilitates the discharging and mixing of the beverage. I am also able to dispense non-carbonated drinks, for example, orangeade, by putting the same in tanks under pressure.

Now, for illustrating the invention, reference is made to the accompanying drawings in which:

Figure 3 is a sectional elevation of one of the dispensing units;

Figure 4 is a plan view of dispensing unit of Figure 3 as seen from above;

Figure 5 is a sectional view taken along the lines 5—5 of Figure 3;

Figure 6 is a view of the top of the cylindrical member with the upper head removed, showing the sealing tongues;

Figure 7 is a view, partly in section, showing mechanism for advancing the cylindrical member in steps of 90° for successively positioning a filled measuring cylinder and its companion syrup cylinder in communication with the discharge nozzle;

Figure 8 is an external view of the front of the cabinet showing the disposition of the cup dispensers, coin slots, etc.;

Figure 9 is a side view of the cabinet showing how the front may be opened;

Figure 10 is a view looking down on top of the cabinet and showing how the front of the cabinet opens up;

Figure 11 is a diagram showing three tanks hooked up to refrigerating means and thence to the dispensing units;

Figure 12 is a detail section of part of the evaporator;

Figure 13 is an enlarged section of the piercing conduit;

Figures 14 and 17 show details of the cup releasing mechanism; and

Figures 15 and 16 show details of coin controlled vending mechanism.

Figure 1:
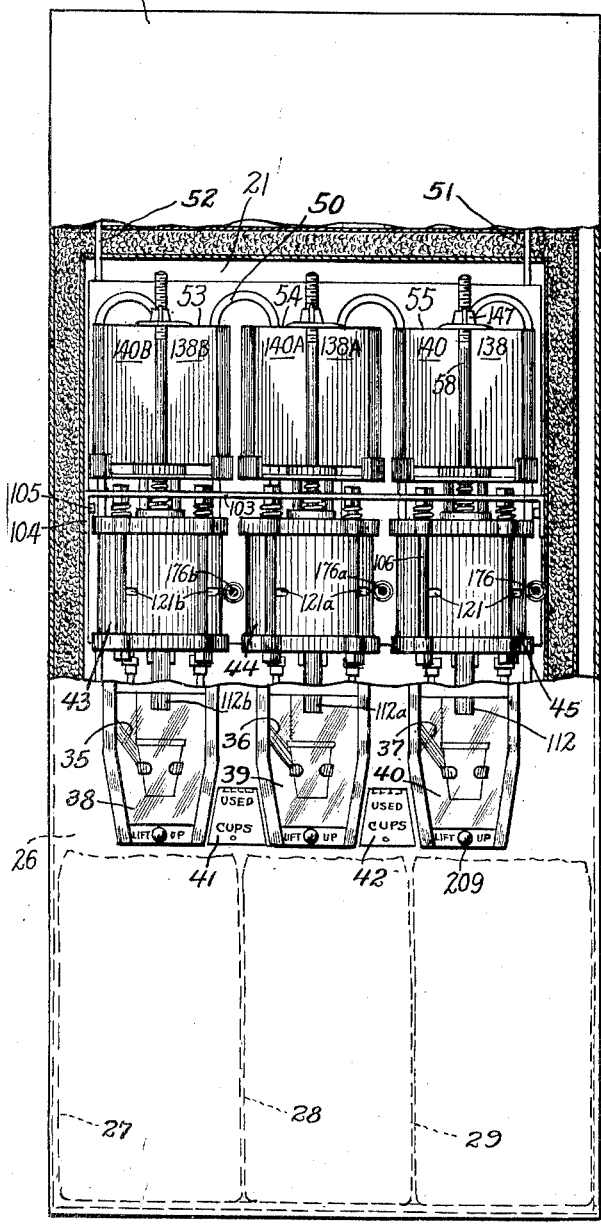
Figure 1 is a front elevation of a vending machine cabinet having partitions broken away to show the dispensing apparatus and other cooperating elements.
Figure 2:
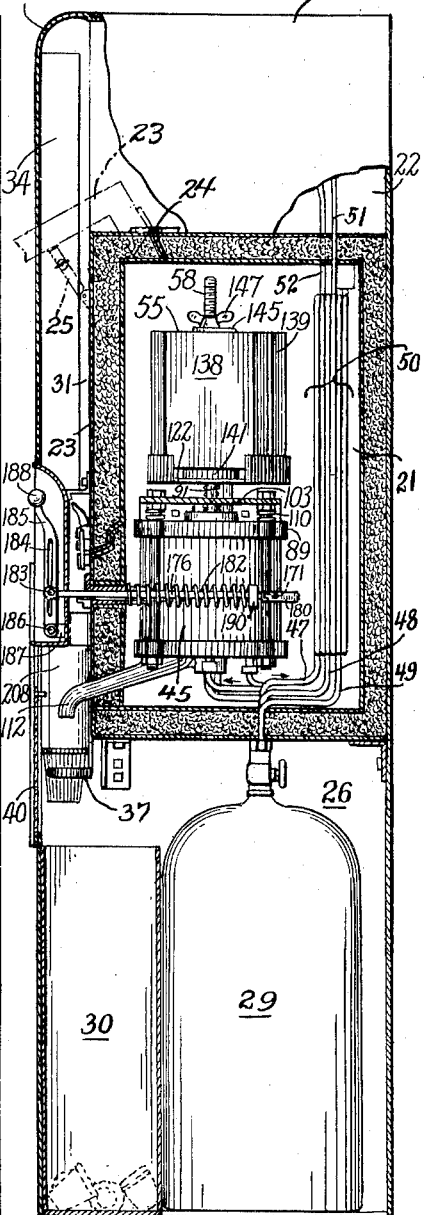
Figure 2 is an end sectional elevation of the cabinet shown in Figure 1.

Referring first to Figures 1 and 2, the cabinet 20 has an insulated compartment 21 mounted therein. The upper end of the compartment 21 is spaced apart from the top of the cabinet to form a chamber 22 for a refrigeration high side unit (not shown). A door 23 giving access to the insulated compartment also includes insulation and is hinged to the top of the insulated compartment by hinges, one of which is shown at 24. A suitable fixture 25 is mounted on the compartment 21 and is provided for securing the door 23 in its open position.

Below the compartment 21 is a space 26 for accommodating several pressure tanks 27, 28, and 29, and a receptacle 30 for receiving waste cups. The compartment 21, it will be noted, is mounted against the rear wall of the cabinet, thereby providing space 31 between its front wall and the front wall of the cabinet and communicating with both the space 26 below and the space 22 above. The space 31 is adapted to contain cup venders, cup holders, discharge nozzles, coin mechanism, etc.

The cup venders are old and well known and need not be described in detail. One cup vender is provided for each station, and since the front of the cabinet 20, on which these are supported, is broken away to show other details, the locations of the three cup venders employed in the device illustrated may be seen in Figure 8, where they are designated by the numerals 32, 33, and 34.

There are also provided, three cup holders, 35, 36, and 37 (Figure 1) one for each dispensing station. As the cup vender for a given station is actuated, in a manner to be presently described, it delivers a cup, right side up, to the cup holder with which it is associated. For example, the cup vender 34 delivers a cup to the holder 37, in time to arrive in position before the actual dispensing starts, thereby making sure the cup receives the drink dispensed.

Vertically slidable doors 38, 39, and 40 may be provided to keep out dust and dirt, and the purchaser may slide the door, protecting his cup, upwardly and lift the cup containing his drink out. After he drinks, he may shove the waste cup through one of the trap doors 41 or 42.

The insulated compartment 21 may contain any desired number of dispensing units, however, in the embodiment illustrated, three such units 43, 44, and 45 are employed. Each dispensing unit is provided with a discharge nozzle which is positioned above the cupholder associated therewith. In Figures 2 and 3, the discharge nozzle 112 is shown on the unit 45.

The tanks 27, 28, and 29 are respectively connected via pipes 47, 48, and 49 to individual conduits formed in the refrigeration low side generally designated by the numeral 50, so that liquids from the tanks may pass therethrough to be cooled. The delivery of refrigerant from the high side unit to the low side is effected through pipes 51, and the suction connection from the low side to the high side is effected through pipes 52.

Above each dispensing unit is provided a syrup or flavor container unit which will be described in detail in connection with Figure 3. The dispensing unit 43 may have a syrup container unit 53; the unit 44, a container unit 54; and the unit 45, a container unit 55.

Referring now to Figure 3, an enlarged sectional elevation of the dispensing unit 45, and its associated syrup container unit 55, is shown. A round section or member 56 has a central vertical hole 57 formed therein which forms a working fit on the shaft 58, see Figures 5 and 6 also.

Vertical holes 59, 60, 61, and 62 spaced 90° apart, and equal radial distances from the center of the hole 57, are formed in the round member 56. The four holes form "measuring cylinders" and should be ground or otherwise smoothly finished. The member may be made of, or the cylinders may be lined with suitable materials to safely contain the liquids to be dispensed without danger of contamination. An example of such material is stainless steel.

Extending from the upper surface of the member 56 and positioned adjacent to the outer circumference thereof is an annular V-shaped tongue. This tongue lies between the circumference of the member and the cylinders 59, 60, 61, and 62.

Also extending from the upper surface of the member 56 is a second annular V-shaped tongue 64, which is substantially smaller than the annular tongue 63. In fact, the outer diameter of the tongue 64 lies quite near to the inner circumferences of the cylinders 59, 60, 61, and 62.

Lying between the inner diameter of the tongue 64 are vertical holes 65, 66, 67, and 68, the centers of which fall in radial alignment with the cylinders 59, 60, 61, and 62, respectively. These holes are smaller in diameter than said cylinders and may form syrup measuring cylinders.

Between the inner circumferences of the holes 65, 66, 67, and 68, and the hole 57 is a third annular V-shaped tongue 69. The annular tongues 63, 64, and 69 are utilized for effecting seals to be presently described. On the opposite end (the lower surface) of the member 56 is a series of annular V-shaped tongues 70, 71, and 72, identical with the tongues 63, 64, and 69 respectively.

Each of the cylinders 59, 60, 61, and 62 is internally threaded at the upper end and fitted with closure disc 73 which has thread engaging the threads in the cylinders. In Figure 3, one such closure disc is shown in the cylinder 61 and the other in the cylinder 59. The cylinders 60 and 62 are likewise fitted with discs, such as the disc 73.

The disc 73 has a downwardly depending boss 74 which is bored out and threaded to accommodate a downwardly projecting guide rod 75, the upper end of which is correspondingly threaded.

Around the base of the boss 74 is an annular depression 76 which forms a seat for the upper end of a compression spring 77. The lower end of the spring engages a piston generally designated by the numeral 78 and mounted on the guide rod 75. Of course, there are four guide rods—one for each cylinder—and each guide rod carries a piston 78.

Each piston 78 may consist of a disc 79 having a hollow hub portion 80 which forms a working fit on its guide rod 75, and a second disc 81 spaced apart therefrom with a disc 82 of piston material, such as synthetic rubber, therebetween. Suitable rivets 83 extend through and secure these parts together to form a unit. The disc 82 effects a seal with this guide rod 75 interiorly, and effects sealing engagement with the walls of the cylinder in which it is mounted. The lower end of the guide rod 75 has an enlargement 84 which limits the downward movement of the piston.

The extreme upper position of the piston, and hence the quantity of liquid in the cylinder, may be controlled in several ways: by the compression of the spring 77 to the position where all the convolutions touch each other: or by providing a sleeve 85 on the guide rod 75. This sleeve permits the piston to move up to a position where the sleeve is engaged (endwise) by both the boss 74 and the boss 80. By having several sleeves of different lengths, the service man may quickly change from one measured quantity to another by unscrewing the guide rod 75, slipping off the sleeve 85, substituting another of a different length and replacing the guide rod 75. This makes the device very flexible and easy to set for the delivery of predetermined quantities of liquid.

A disc 86 formed of leather, plastics or other suitable material joins up with the top surface of the section or member 56, and sealing is effected therebetween by the tongues 63, 64, and 69. Where the disc 86 is formed of leather, pressure may be employed to cause these tongues to form grooves in the leather. Where plastics are employed, the grooves may be molded or otherwise formed therein.

A second disc 87 joins up with the bottom surface of the member 56, and grooves therein effect fluid tight seals with the annular tongues 70, 71, and 72.

A head plate 88 abuts the disc 86 and is provided with an annular flange 89 which extends below the disc 86 and engages the member 56 forming a working fit with the upper periphery of said member. The head plate has a central hole therethrough to accommodate the shaft 58, and has three threaded holes 90 therein to accommodate special fittings 91, which will presently be described.

A plurality of vents 91a are formed in the disc 86 and in the head plate in alignment with each other, each being positioned above and in communication with a corresponding vent 92, formed in the cylinder discs 73, when the cylinders are in normal position. There are four such vents, one for each cylinder; and each vent permits air to escape when the cylinder is being filled with liquid, and lets air into the cylinder which is discharging its liquid. A vent 93 is in the path of the auxiliary or syrup cylinders 65, 66, 67, and 68, and is positioned in position to be in communication with each of these cylinders as they reach the discharging position to supply air to take the place of the syrup flowing therefrom.

The second or bottom disc 87 has a plurality of holes 94; one for each of the main cylinders 59, 60, 61, and 62, which are concentric with these cylinders when the member 56 is normally at rest. The disc 87 also has a hole 95 formed therein, with which each of the syrup cylinders 66, 65, 67 and 68 coincide when they are moved to their discharge positions.

A bottom plate 96 abuts the disc 87 and is provided with an annular flange 97 which extends above the disc 87 and engages the member 56, forming a working fit with the lower periphery of said member. A central boss 98 is formed integral with the bottom plate 96, and a hole therethrough to accommodate the shaft 58. The hole may have a keyway formed therein to be engaged by a key 99 carried by the shaft 58, and the bottom plate may be secured on the shaft by a nut 100 engaging the threaded end of the said shaft. The head plate 88 is provided with bosses 101, and the bottom plate is provided with corresponding bosses 102.

A cross member 103 positioned above the head plate 88 is provided with angular ends, one of which is shown at 104, through which bolts, such as those shown at 105 for securing the cross-member in the compartment 21. Holes 103a in the cross-member are in alignment with the holes in the bosses 101 and 102, and tie rods 106 having threaded ends are positioned in the aligned holes in the bosses and cross-member. Nuts 107 engage the lower ends of these rods and contact the bosses 102. Nuts 108 engage the upper ends of these tie-rods and contact the upper surface of the cross-member 103. Nuts 109 also engage the upper ends of the tie rods between the crossmember and the head plate 88 and bear against the lower face of the cross-member so that the latter is rigidly secured between nuts 108 and 109. Between each nut 109 and each boss 101 are compression springs 110, which embrace the tie rods and exert downward pressure on the head plate 88. The shaft 58 also passes through the cross-member 103, and a compression spring 111, similar to the springs 110, is positioned on the shaft 58 between the cross-member and the head plate 88.

The bottom plate 96 is provided with a discharge nozzle 112 which has a passage 113 formed therein. The discharge end of the passage may carry a strainer 117, and the inner end of the passage widens out and terminates in holes 114 and 115 in the bottom plate. A deflecting web 116 is adjacent to the hole 114. The hole 114 communicates with the hole 94 through which the main cylinders when in the discharge position, deliver the liquid. The hole 115 is in alignment with the hole 95 through which the auxiliary or syrup cylinders, when in the discharge position, deliver their contents to the passage 113. The web 116 deflects the liquid passing in via the hole 114 causing a swirling thereof and facilitating the mixture of the same with syrup passing in via the hole 115, and this mixing is further facilitated by passage through the strainer 117.

The bottom plate 96 also has three bosses 118 in axial alignment with the main cylinders 59 that are not in the discharging position. These bosses are each provided with a hole 119 which coincides with its neighboring hole 94 in the disc 87. The bosses are externally threaded to accommodate fittings 120, pipes from which lead to the several cooling sections of the evaporator 50.

The member 56 has four notches 121 (one for each main cylinder) for use in advancing the same in steps of 90 degrees, as will presently be described in connection with Figure 7.

A plate member 122 has a boss 123 with a hole therein to accommodate the shaft 58. Embracing a portion of the length of the boss 123 and contacting the plate member 122 and the crossmember 103 is a spring 124. The plate member 122, as may be seen in Figures 3 and 4, is in the form of three quarters of a square, with the corners 125, 126, 127, and 128 of the square severed at right angles to the diagonal lines thereof. In place of the fourth quarter is a triangular sector 129.

Secured to the plate member along the severance line 125 is a vertical web 130 having a portion 130a extending radially, and a portion 130b angular to the main portion of the web and extending toward the severed corner 126, where a vertical web 131 is secured. The web 131 has a midpoint extension 131a extending radially, a portion 131b extending toward and in alignment with the portion 130b, and a portion 131c extending toward and in alignment with an angular extension 132c of a web 132 extending across the severed corner 127. The web 132 also has a midpoint radial extension 132a, and a second angular portion 132b which extends toward and in alignment with an angular portion 133b of a web 133 extending across the severed corner 128. The web 133 also has a radial portion 133a.

In alignment with the radial portions 130a, 131a, 132a, and 133a are corresponding radial members 134, 135, 136, and 137 respectively, located on the plate member 122 adjacent to the shaft 58.

When a syrup container 138 is to be positioned on the plate member 122, the web portions 134, 130a, 130, 130b, 131b, 131, 131a, and 135 define a socket to receive the container. Likewise the web portions 135, 131a, 131, 131c, 132c, 132, 132a and 136 form a socket to receive the container 139; and the web portions 136, 132a, 132, 132b, 133b, 133, 133a, and 137 form a socket to receive the container 140.

The three special bushings 91 above referred to are positioned in the threaded holes 90 in the plate 88, and these holes are in alignment with the auxiliary syrup cylinder positions 2A, 3A, and 4A, while the auxiliary cylinder position 1A in Fig. 4 communicates with the vent 93 (in Fig. 3). The bushings 91 extend through corresponding clearance holes formed in the cross-member 103, and holes in alignment therewith in the plate member 122. A sealing mat 141 of rubber or the like or any other suitable material is positioned on the plate member 122, and the syrup containers when in their operative positions have their bottoms forced into intimate contact with the mat 141. The upper ends of the bushings 91 extend through holes in the mat 141 aligned with the holes above mentioned, and have a V-shaped slot 142 formed therein and knife edges 143 formed thereon. Normally the mat has a thickness extending up almost to the peaks of the knife edges 143, so that when a container is positioned in one of the sockets, these peaks are in contact with the bottom of the container and, as downward pressure is applied to the container, the knife edges pierce the bottom of the container. As the container continues to move downwardly under pressure, the rubber of the mat is compressed and the knife edges 143 form a hole in the bottom of the container through which the syrup may flow freely into the auxiliary cylinders below.

On the upper end of the shaft 58 is a spider 144 having a hole therein to accommodate the shaft, and three arms 145 which are curved downwardly and terminate with sharp points. The upper end of the shaft 58 is threaded and carries, above the spider 144, a washer 146 and a wing nut 147. After the syrup containers are positioned in their sockets, the spider, the washer and the wing nut are applied to the shaft, and the wing nut is screwed down, thereby applying pressure to the spider, which pressure is thence imparted to the containers. As the wing nut 147 is screwed down, the knife edges 143 pierce the bottom of the container as above described, and at the same time the sharp ends of the spider arms 145 pierce the tops of the containers and form air vents 148 therein to admit air to the containers as the contents flow out into the auxiliary cylinders as above described.

In Figure 4, the main measuring cylinder 59 is shown in the discharge position (in communication with the discharge nozzle 112). This position is termed, "position No. 1." It will be understood that as the machine continues to be operated, the main cylinders 60, 61, and 62 are successively brought to this "position No. 1," where the contents thereof are discharged. The auxiliary or syrup cylinder 65 is shown in its discharge position, in Figure 4, with the upper end communicating with the vent 93 and the lower end discharging into the discharge nozzle 112 (along with the contents of the cylinder 59). This position is termed "position No. 1A," and as the machine is operated, the other auxiliary cylinders are successively brought to this position.

The main cylinder 60 is shown in a position termed "position No. 2," where it has been filled, as will be hereinafter described, and will, upon the next operation of the machine, be moved to the discharge position (position No. 1). The companion auxiliary cylinder 66 is shown in a position termed "position No. 2A."

The main cylinder 61 is shown in a position termed "position No. 3," which is two operational steps away from the discharge position, and its companion auxiliary cylinder 67 is shown in a position termed "position No. 2A," which is also two operational steps away from its discharge position.

The main cylinder 62 is shown in a position termed "position No. 4," which is the position into which the discharged or empty cylinders are moved to from position No. 1, and its companion auxiliary cylinder 68 is shown in a position termed "position No. 4A."

Now, considering the auxiliary or syrup cylinders: any empty auxiliary cylinder moved from position No. 1A to position No. 4A, is immediately "valved" into communication with the interior of the fitting 91 permanently located in the No. 4A position, and communicating with the syrup container 140, whereupon said auxiliary cylinder fills with syrup (as long as any remains in the container 140). Upon the next operation, the filled auxiliary cylinder is moved to position No. 3A where it communicates with the fitting 91 permanently located in this position and, in turn, communicating with the container 139. Due to the fact that this cylinder was already filled when in position No. 4A, it cannot take on any more syrup, so nothing happens. Upon the next operation this cylinder moves to the No. 2A position in communication with the container 138, but here again, nothing happens because this auxiliary cylinder was previously filled at position No. 4A, and cannot take in any more syrup. Upon the next succeeding operation of the machine, the said auxiliary cylinder is moved to position No. 1 where it discharges. During the steps just discharged, the other auxiliary cylinders have been successively moved through the position No. 4A and filled.

When the container 140 is empty, the auxiliary cylinders cannot fill, in the position No. 4A, so they fill from container 139 when they arrive in position No. 3A. Likewise, when container 139 is empty, the auxiliary cylinders can no longer fill, in the No. 3A position, so they fill when they arrive in the No. 2A position from container 138.

Assuming that the servicer comes along and replaces empty containers 140 and 139, the auxiliary cylinders in position No. 4A and No. 3A immediately fill, and container 140 again supplies the syrup until empty, then container 139, until empty, and again container 138 etc.

In Figure 11 is shown diagrammatically, a preferred way of connecting tanks, the pressure tanks 27, 28, and 29 to the apparatus. The evaporator 50 may consist of three sections 148, 149, and 150, all identical, and each section may be of a type, as illustrated in Figure 12, where an intermediate sheet or plate 151 has a pre-formed plate 152 with passages 153 for the charged water or beverage welded or otherwise secured thereto in fluid tight relation. The plate 151 also has secured to its opposite face a second pre-formed plate 154 with passages 155 formed therein for the refrigerant.

The refrigerant passages 155 in the three sections have their upper ends connected in multiple with branch pipes 156 and to the suction line 52 leading to the compressor 157. A motor 158 drives the compressor and the compressed refrigerant is delivered to the condenser 159 to be cooled by fan 160, liquified and collected in receiver 161. The liquid line 51 leads from the receiver to an expansion valve 162, whence the refrigerant is led in parallel to the lower ends of the conduits 155. By this arrangement the water or beverage is very efficiently cooled.

The tank 27 is connected via pipe 47 to the lower end of the passage 153 in section 148, and the upper end of the passage is connected to a pipe 163 which feeds branch pipes 164 leading to the No. 4 positions in the dispensing units 43, 44, and 45 (Figure 11).

The tank 28 is connected via pipe 48 to the lower end of the passage 153 in section 149, and the upper end of this passage is connected via pipe 165 and branch pipes 166 to the No. 3 position in the dispensing units 43, 44, and 45.

Likewise the tank 29 is connected via pipe 49 to the lower end of the passage 153 in section 150 and the upper end of this passage is connected via pipe 167 and branch pipes 168 to the No. 2 positions in the three dispensing units.

The syrup containers 138, 139, and 140 are indicated as delivering syrup respectively to 66 (position No. 2A), 67, (position 3A) and 68 (position 4A), respectively (as is shown in Figure 4). The syrup containers for feeding the same positions in dispensing unit 44, are designated 138A, 139A, and 140A; and corresponding containers for feeding the same positions in dispensing unit 43 are designated respectively 138B, 139B, and 140B.

From this hook-up it will be seen that, due to the fact that the main cylinders of any of the three units, when moved from the No. 1 or discharge position to the No. 4 position will immediately be filled from the tank 27, and at the same time its companion auxiliary cylinder will fill with syrup from syrup container 140, 140A, or 140B (depending on which dispensing unit was operated).

As soon as the tank 27 approaches emptiness, its pressure becomes reduced, but an important feature of my system is: that any cylinder filled at lowered pressures is subjected to the pressure of one or more fully charged tanks before it reaches the discharge position. For example, when tank 27 is almost empty and its pressure is lowered, the cylinders supplied by it in the No. 4 position, move to the No. 3 and then the No. 2 position before reaching the discharge or No. 1 position, and since the tanks supplying the No. 3 and the No. 2 positions are full of charged water with a higher pressure, the contents of said cylinders are actually "fortified." Now, since the main cylinders contain only charged water, fortifying this charged water cannot produce foam.

When tank 27 becomes exhausted, the main cylinders are then supplied from tank 28, when they arrive in the No. 3 position. When tank 28 becomes exhausted the cylinders are filled when they arrive in the No. 2 positions. The service man can then remove and replace tanks 27 and 28 with freshly charged ones, and immediately the cylinders start filling in the No. 4 position from the new tank 27.

Another arrangement might be to connect a very large tank to position 2, but such a tank of carbonated water would be unwieldly for the service man to handle, and furthermore how can he tell when the tank will be empty?

I find that having several tanks of a size conveniently handled, the service man may replace those tanks which are empty or susbtantially so, and render better all-round service.

The service man can detect at a glance, and replace any empty syrup containers, due to the fact that the fittings 91 are transparent. In Figure 13, one form is shown, wherein a metallic portion 169 carries the V slot 142 and the knife edges 143 and is molded onto or otherwise secured to a transparent tubular body 170.

When the containers 140, 140A, and 140B delivering syrup to the auxiliary cylinders in the No. 4A positions in the dispensing units 45, 44, and 43, respectively, become empty, the containers 139, 139A, and 139B then start delivering to the auxiliary cylinders when they arrive at the No. 3A positions, and when they become empty, the containers 138, 138A, and 138B start delivering to the auxiliary cylinders when they arrive in the No. 2A positions in the several dispensing units 45, 44, and 43.

It will be understood, of course, that this action is automatic, and comes about as follows: with all containers full or practically full, all auxiliary cylinders fill from containers 140, 140A, and 140B, in the several dispensing units, in the No. 4A positions, and as the dispensing units are operated, the auxiliary cylinders which have been filled in the No. 4A position, are advanced to the No. 3A position. In the No. 3A position, they are in contact with syrup in containers 139, 139A, and 139B, but since they are already full, they can receive no syrup from containers 139, 139A, and 139B. If one or more auxiliary cylinders had been only partially filled in the No. 4A position (due to the fact that one or more containers 140, etc., in the No. 4A position were completely exhausted), they would finish filling when they arrived in the No. 3A position, from containers 139, 139A, and 139B.

Filled auxiliary cylinders arriving in the No. 2A position cannot receive any syrup from the containers 138, 138A, and 138B; however, partially filled or empty auxiliary cylinders arriving in the No. 2A position can, therefore, when the containers 139, 139A, and 139B, in the No. 3A position become empty, the auxiliary cylinders are filled in the No. 2A position from containers 138, 138A, and 138B.

As soon as the service man replaces the empty containers, the auxiliary cylinders again start filling when in the No. 4A position.

As an example of mechanism for advancing the members 43, 44, and 45 in steps of a quarter-turn or 90 degrees, reference is had to Figure 7, wherein the round section or member 56 is provided with four equally-spaced notches 121 previously described. A rachet arm 171 has a curved engaging end 172 adapted to engage any one of the notches 121. The rachet arm has a longitudinal slot 173 formed therein. A head member 175 has a lateral slot 174 formed therein in which the rachet arm 171 forms a working fit. Pins 175a extending through the head member at right angles to the slot 174 and extend through the slot 173 in the rachet arm and serve to limit the fore and aft movement thereof.

The head member 175 is mounted on a shaft 176 which, in turn, is reciprocally mounted in a bearing 177, the outer end of which carries a flange 178 which is secured to the casing 21 by means of bolts 179.

A leaf spring 180 secured to the head 175 by means of a bolt 181, bears against the end of the rachet arm 171 and constantly urges it into engagement with a notch 121 during its transit from one position to a corresponding position 90 degrees away.

Spring means 182 embracing the shaft 176 is provided for returning the shaft and the head member 175, carried thereby, to its normal position. (The position shown in solid lines in Fig. 7.) One end of the spring means engages the wall 21 and the other end engages a cupped bushing 190 mounted on the shaft 176.

The shaft 176 carries a cross stub shaft 183, as may be seen in Fig. 9, and this stub shaft engages a slot 184 formed in the operating lever 185. The lower end of the operating lever is journaled on a shaft 186 mounted in a yoke member 187 on the casing 20.

A depression plate 189 mounted in the cabinet 22 (Figs. 8, 9, and 10) forms a niche in the front door 20a thereof in which the handle 185 with its knob 188, and also the yoke 187 are normally positioned. It will be noted that the door 20a may be opened without disturbing the lever 185 or any of the mechanism connected thereto.

Returning to Figure 7, the shaft 176 and the rachet arm 171 are shown in their normal positions in solid lines. The main cylinder in position No. 2 and its companion syrup cylinder in position No. 2A are respectively full of carbonated water and syrup. Now in order to dispense the liquid in these cylinders, they must be advanced to the No. 1 and the No. 1A positions, which means rotating the member 56 one quarter turn (90 degrees). The handle 188 is grasped and pulled forward, thereby moving the shaft 176 to the left as viewed in Figure 7, and causing the rachet arm (which engages the notch 121) to move the member 56 in a clockwise direction until the rachet 171 is halted by a definite stop 191 which is secured to the wall 21 by means of bolts 192.

When the rachet arm 171 engages the stop 191, the member 56 has been rotated 90 degrees and the main cylinder has advanced from the No. 2 position to the No. 1 position and the companion cylinder has, at the same time, advanced from the No. 2A position to the No. 1A position, and both are in communication with the discharge nozzle 112 (as may be seen in Figure 3). As soon as the handle 188 is released, the spring means 182 returns the lever, the shaft and the rachet arm to their normal positions ready to be operated again.

Within a casing 193 is mechanism shown in detail in Figures 15 and 16. On each shaft 176 is carried a key member 194. The mechanism includes beveled lock-out slides, or blocks 196, 196A, the total lengths of which are equal to the length of the space within the casing minus the thickness of a single key—so that when any one key is between them (due to the advancing of one of the shafts 176) no other shaft can be operated.

Also mounted in the casing 193 are price bars 197, 198, 199, 200, and 201 parallelling each other and common to all the dispensing levers. The price bar 197 may represent 25¢; the price bar 198, 20¢; the price bar 199, 15¢; the price bar 200, 10¢; and the price bar 201, 5¢. Cam blocks may be provided for associating any price bar with any delivery mechanism. For example, the cam block 202 has a rearwardly-extending tongue 203 which fits in a corresponding notch in the price bar 200, thereby associating the mechanism carrying the key 194 with the 200 or 10¢ price bar.

Connected to a coin mechanism 218 (not shown in detail) is a positionable member 195 having a notch 204 formed therein, which is advanced laterally with respect to the ends of the price bars in accordance with the value of the coins inserted in the coin mechanism. For example, the notch 204 is shown in line with the price bar 200, a position corresponding to 10¢. Now, if the key 194 is moved forward, it engages surface 205 of the cam block 202 and urges the end of the price bar 200 into the notch 204, permitting the shaft 176 to continue to be moved to effect the dispensing of the beverage (by advancing the cylinder from the No. 2 position to the No. 1 position and its companion from the No. 2A position to the No. 1A position). If the positionable member 195 were in a position where its notch 204 is not in line with the end of the price bar 200 (due to the insertion of more or less than 10¢ in the coin mechanism) the end of the price bar 200 would be moved into contact with a solid portion of the positionable member 195 and further movement of the shaft 176 is impossible.

The cup mechanism is of a type usually employed in vending machines which delivers a cup to a station to receive a beverage. Referring to Figure 14, the cup mechanism 34 is shown in part. It includes an arm carrying a cam end or button 206 which, when actuated, releases the bottom cup 207. The released cup 207 is guided by the curved portion of a depending plate 208 (Figure 2) which supports the cup holder 37, the cup landing in the holder "right-side up."

In Figure 17 is shown an arrangement permitting the door to be slid upwardly without releasing a fresh cup and at the same time insuring the release of a fresh cup when the door is returned to its normal position.

When a purchaser raises the slidable glass door 40, by grasping the knob 209 and pulling upwardly, access may be had to the then filled cup in the holder 37. While the glass door 40 is raised as described, a stud 210 extending rearwardly through a vertical slot 210a, "rachets" over the button 206 without actuating it. When the purchaser removes the filled cup from the holder and releases the door 40, it slides back down to its normal position, with the result that the stud 210, moving in the opposite direction, positively engages and actuates the button 206. This causes the cup mechanism to release the bottom cup and deliver it to the holder 37.

The stud 210 has a rounded tongue portion 211 which forms a working fit in a slot 212 formed in a spud 213 fixedly mounted in the frame of the door 40, with a pivot pin 214 passing therethrough. A spring 215 secured to the door frame by a screw 216 normally urges the end 210 up to a horizontal position with the angular surfaces 217 in contact. When the door moves upwardly and the outer end 210 encounters the button 206, the spring 215 yields and allows the end 210 to swing on the pivot pin 214 and "rachet" past the button 206. When the door moves downwardly, the surfaces 217 come together, making the stud rigid, and it actuates the button 206.

I have described herein that when the pressure of the tank of carbonated water connected to the No. 4 position becomes subnormal, the carbonated water delivered to a main measuring cylinder in the No. 4 position is strengthened by fluid contact with the carbonated water of the tank connected to the No. 3 position when the turret is rotated to move said main measuring cylinder to the No. 3 position, and may be further strengthened by the fluid contact with the carbonated water in the tank connected to the No. 2 position when the turret is moved to bring said cylinder to the No. 2 position.

The pressure in the tanks may be, for example, 125 pounds to the square inch at full charge, and when the tank is about 95% empty, the pressure has dropped to about 30 pounds to the square inch, therefore the feature described above effects the fortifying or increasing the strength of the carbonated water in the main cylinders as they progress toward the No. 1 or delivery position.

I have found that I can proportion the springs 77 acting against the pistons 78 so that the piston cannot be displaced after a predetermined low pressure is reached by the tank. It will be readily apparent that as the pressure (in the tank connected in the No. 4 position, for example) decreases and approaches the minimum pressure capable of displacing the piston, less and less carbonated water is delivered to the cylinders in the No. 4 position; and then when the more or less partially filled cylinders arrive in the No. 3 position, they encounter carbonated water at a much higher pressure and their filling is completed. This results in the mixing of the stronger and weaker carbonated water, producing water of a satisfactory strength.

In time, the pressure of the tank connected to the No. 3 position becomes gradually weaker so that less and less carbonated water is delivered to the cylinders in the No. 3 position. However, the cylinders as they leave No. 3 position and next arrive in the No. 2 position encounter another fully charged tank connected to the No. 2 position, with the result that the carbonated water from the last-mentioned tank finishes filling the cylinders in the No. 2 position and the weaker and the stronger waters mix to form a satisfactory carbonated water for dispensing. Now, when the pressure in the tank connected to the No. 2 position falls to a predetermined low pressure (predicated on the lowest pressure beyond which the carbonated water is satisfactory) a pressure control device (not shown) connected to the pipe 167 or the branch pipes 168, which are supplied by the tank 29, and which lead carbonated water to the No. 2 position in all three dispensing units, Figure 11, may disable the coin release mechanism and prevent the machine from being operated.

The spring 77 may in some instances be wound with certain portions of its length less resilient than other portions thereof, or 77 may comprise spring means including two or more springs of different resiliencies which are effective for different portions of the pistons in the cylinders.

Although I have shown and described herein dispensing apparatus for illustrating the invention, it will be understood that many changes may be made in the arrangements herein shown without departing from the spirit of the invention as set forth in the annexed claims.

The term "turret" employed herein should be taken to mean a body movable on an axis in the steps and means to effect such movement.

It will be understood that the main cylinders are employed for measuring liquids under pressure and constitute at least the major portion of the beverage being dispensed, while the auxiliary cylinders are employed for measuring liquids such as flavors, syrups, etc., fed by gravity and constituting a minor portion of the beverage being vended. It will also be understood that the main cylinders may be employed alone for dispensing (leaving the auxiliary cylinders inactive). An example of this is in dispending non-carbonated fruit drinks. These drinks are placed in tanks under pressure and connected up in substantially the same manner as shown for tanks 27, 28, and 29. If these tanks all contained an orange drink for instance, the tank 27 would supply all of the main cylinders when they arrive at the No. 4 position (62) until the tank 27 is exhausted, then tank 28 would supply the cylinders in the No. 3 position (61) until that tank is exhausted, then tank 29 would supply the cylinders when they arrive at the No. 2 position (60); and since the orange drink is complete it would not be necessary to use the auxiliary cylinders at all. If the containers of non-carbonated fruit drinks are positioned substantially above the dispensing units, they will deliver the fruit drinks thereto by gravity, especially if the springs 77 are right. These arrangements are given as an example. Obviously, many other arrangements may be made within the scope of the invention.

It will also be understood that, although I show four main cylinders and four auxiliary cylinders in each dispensing unit, I may use a greater or a lesser number of main and auxiliary cylinders in each unit, and I may use a greater or lesser number of units, and further in some instances I may make units with main cylinders and no auxiliary cylinders, and may, in some instances, omit the pistons from the main cylinders.

When this is done, the vents have associated therewith valves which allow the air to escape, when the cylinders are receiving liquid, and which float closed when encountered by liquid. The capacities of the cylinders, in this event, may be controlled by the insertion in the cylinders of stainless steel or glass sleeves of different thicknesses. The capacities of the auxiliary cylinders may also be varied in the same manner.

Having described my invention, I claim:

1. In a beverage dispenser, a measuring cylinder, a piston reciprocally mounted in said cylinder, stop means adapted to be engaged by said piston, said cylinder being adapted to be subjected to a source of liquid under pressure, thereby causing said piston to be displaced by said liquid until it comes to rest against said stop, a second auxiliary cylinder communicating with a source of syrup adapted to be filled therefrom by gravity, a discharge nozzle, and means for moving said cylinder from the influence of said source and said auxiliary cylinder from communication with said source of syrup and into communication with said discharge nozzle to deliver the measured quantities in a mixed state therefrom.

2. In a beverage dispenser, a measuring cylinder, a piston reciprocally mounted in said cylinder, spring means normally urging said piston toward one end of said cylinder, said last mentioned end of the cylinder being adapted to be subjected to a source of liquid under pressure, thereby causing said piston to be displaced against the urge of said spring means by said liquid, a second auxiliary cylinder communicating with a source of syrup adapted to be filled therefrom by gravity, a discharge nozzle, and means for removing the cylinder and the measured quantity of liquid therein from the influence of said liquid source and said auxiliary cylinder from communication with said source of syrup and placing them in communication with said discharge nozzle, whereby the ejection of the liquid from the cylinder is abetted by the urge of said spring means on said piston and the syrup flows from said auxiliary cylinder and mingles with said liquid.

3. In a beverage dispenser, a body member having a center hole therein forming a journal, a shaft with which said journal forms a working fit, a plurality of main cylinders formed in said body member from end to end substantially equidistant from said center hole and substantially equidistant from each other, supporting means for said shaft, an auxiliary or companion cylinder formed in said body for each of said main cylinders, a stationary head member engaging one end of said body member and forming a closure for corresponding ends of all said cylinders, a second stationary head member engaging the other end of said body member and forming a closure for all of the other ends of said cylinders, both said head members making fluid tight contact with the ends of said body member, a discharge port formed in one of said head members, a plurality of inlet ports also formed in said last mentioned head member, said ports normally communicating with said cylinders at least one of said inlet ports being adapted to be connected to a source of carbonated water, said auxiliary being adapted to receive syrup from a source of the same cylinders, and means for rotating said member in increments or steps corresponding to the spacing of said cylinders to moved a filled cylinder and its auxiliary cylinder into communication with said discharge port.

4. In a dispensing machine, a round elongated body member having a plurality of main cylinders formed therein, an auxiliary cylinder formed in said body for each of said main cylinders, a fixed head member positioned on one end of said body member with a sealing member therebetween, a second fixed head member positioned on the other end of said body with a second sealing member therebetween, said sealing members serving to isolate all said cylinders from each other, said main cylinders being adapted to be filled with carbonated water under pressure via one of said heads, said auxiliary cylinders being adapted to be filled with syrup or flavor via the other of said heads, a discharge nozzle carried on one of said heads, and means to rotate said body in steps to conjointly bring a filled main cylinder and its auxiliary cylinder into communication with said discharge nozzle for dispensing their contents.

5. In a beverage dispenser in which a predetermined quantity of carbonated water and a predetermined quantity of syrup are adapted to be delivered to a container, a support, a deformable mat on said support, a piercing conduit extending through said support and said mat and having piercing edges substantially level with the upper surface of said mat, said mat being adapted to have a syrup container positioned thereon and said conduit being adapted to pierce said container, a vent piercing member adapted to contact the upper surface of said container, means for exerting force upon said container via said member and thereby causing said member and said conduit to pierce the top and bottom of said container respectively and compressing said mat to effect a seal between said bottom and said conduit, and a series of means traversing a path adjacent to the lower end of said conduit and adapted to receive syrup from said conduit sequentially.

6. In a beverage dispenser, a generally horizontal support having a plurality of upstanding edges and extensions thereof forming a preshaped socket of a predetermined depth adapted to contain a sealed container of fluid having a cross-section and a height substantially like that of said socket, conduit means for leading fluid from said container, means for piercing the bottom wall of said container and placing the interior of the container in fluid tight relation with the interior of said conduit, a vent forming member adapted to pierce the top of said container, and means for causing said member to function.

7. A beverage dispenser according to claim 6, in which said support has a plurality of pre-shaped sockets, one of said conduit means being provided for each socket, each socket being adapted to receive a pre-shaped container with the fluid therein in communication with the conduit means therein, means for forming vents in said containers, said conduits terminating along a predetermined path, a movable member having a plurality of measuring cavities formed therein, and means to move said member in steps to cause said cavities to traverse said path, whereby said cavities, filled by fluid from one of said containers, traverses the ends of the other conduits of the series and receives fluid from the next succeeding conduit only after fluid in the container connected to the preceding conduit is exhausted.

8. In a beverage dispenser, a generally horizontal support having means associated therewith to form a plurality of pre-shaped sockets of predetermined depth each adapted to receive a sealed pre-shaped fluid container, piercing conduit means in each socket, means for exerting pressure on said containers to cause each conduit means to pierce the bottom of the container in its socket, means for venting the tops of said containers, means for placing the interiors of said conduits in fluid tight relation to the interiors of the containers with which they are associated, the termini of said conduit means being disposed along a portion of a predetermined path, a discharge port positioned on said path, a member having a plurality of measuring cavities formed therein, and means for moving said member along said path in steps to cause said cavities to sequentially traverse said path, whereby the first conduit means delivers fluid to said cavities successively and the then filled cavities traverse the termini of the other conduit means before reaching said discharge port.

9. In a beverage dispenser, a series of tanks of carbonated water under pressure, a measuring device and means to move the same in steps, each of which places it in fluid contact with the water in a different tank of said series a spring loaded piston in said cylinder adapted to be displaced by water under pressure greater than a predetermined minimum; whereby said device, when incompletely filled from a tank in which the pressure is substantially reduced due to repetitive withdrawal of liquid therefrom, has its contents strengthened by fluid contact with at least one other tank in said series in which the pressure is higher.

10. In the art of dispensing beverages, the method of strengthening the points of carbonation of measured quantities of carbonated water drawn from a source of said liquid in which the pressure is reduced by repetitive drawing therefrom and the points of carbonation of the water are consequently reduced which includes the step of drawing off a portion of said carbonated water proportionate to the pressure on said source, and the further step of adding to said portion additional carbonated water, from a second source of carbonated water at a pressure higher than that of said first source the points of carbonation of the water from said second source being consequently higher, to make up or complete said measured quantity.

11. In a beverage dispenser, a plate forming a support and having a series of ports formed therein at least one of which is a discharge port and the others of which form inlet ports adapted to have tanks of carbonated water individually connected thereto, a cylinder in contact with said plate and adapted to receive via one end thereof a measured quantity of liquid from the first inlet port in said series, a piston in said cylinder, spring means urging said piston toward said plate, said spring means exerting via said piston a predetermined urge upon the liquid in said cylinder, whereby as the pressure of the tank of carbonated water connected to said first inlet port becomes substantially reduced due to repetitive withdrawing of liquid therefrom, said spring means permits less and less liquid to enter said cylinder, the tanks of carbonated water connected to the other inlet ports in said series serving, as the cylinder traverses said last ports, to finish filling the cylinder and to fortify or strengthen the carbonated water in the cylinder, thereby effecting the delivery of carbonated water at satisfactory pressures as said cylinder is moved into communication with said discharge port.

12. In a dispensing machine, a plane support, a turret in fluid tight contact with the surface of said support and means for advancing said turret along a predetermined path in steps on said support, a discharge port in said support, a liquid supplying port in said support spaced apart from said first port along said path, a plurality of measuring cylinders formed in said turret in spaced relation to each other, the spacing being similar to the spacing of the ports, a different one of said cylinders being moved into communication with said discharge port each time said turret is advanced one step, a spring loaded piston in each cylinder and urged toward said support, said supplying port being adapted to be connected to a supply of carbonated water under pressure, whereby each empty cylinder, after being advanced along said path from the discharge port, traverses said liquid supplying port and fills with said water before it is again advanced along said path to bring it into communication with said discharge port, said piston being displaced by said water as said cavities are filled, and adapted to facilitate the discharge of said water therefrom.

13. In a beverage dispenser, a body member rotatably mounted on a shaft, a plurality of measuring cylinders formed in said body equally spaced radially from the center of said shaft and angularly equidistant from each other, a spring loaded piston in each cylinder, closure members at each end of said member and forming closures for the ends of said cylinders, a plurality of conduit connection ports and a discharge port on one of said closure members, a discharge nozzle connected to said discharge port, said other ports being individually connected to sources of liquid under pressure for sequentially delivering said liquid to said cylinders and displacing said pistons as said member is rotatably moved on said shaft in steps in communication with said other ports, said pistons being adapted to facilitate the discharge of liquid from said cylinders as each is moved into communication.

14. In a beverage dispenser, a support carrying an inlet port and a discharge port, a measuring cylinder rotatably mounted on said support, a piston reciprocally mounted in said cylinder, means urging said piston toward one end of said cylinder, stop means between said piston and the other end of said cylinder, said first end of said cylinder being adapted to be subjected via said inlet port to the influence of a source of liquid under pressure, thereby causing said liquid to enter said cylinder and displace said piston until the latter engages said stop means and defines a predetermined measured quantity in said cylinder, and means for removing said cylinder from the influence of said source and placing it in communication with said discharge port through which said liquid is dispensed.

15. In a beverage dispenser, a supporting plate, a shaft extending through said plate and having its axis 90° with respect to the face of the plate, a member having a central hole therein journaled on said shaft and movable on said plate, a plurality of measuring cylinders in said member parallel to and equidistant from said central hole, means for rotating said member on said plate in steps to cause said measuring means to traverse a circular path, a series of inlet ports disposed in said plate and along said path, a discharge port also positioned in said plate and on said path, said steps being the same in number as the number of ports and each of the latter communicating with a different cylinder as said member comes to rest at the end of each step, said inlet ports each adapted to have individual tanks of carbonated water connected thereto, whereby the tank connected to the first port in the series fills said each cylinder as it comes into communication therewith at the end of each step and eventually, after repetitive fillings therefrom, its pressure becomes lowered and the carbonation of the water therefore is weakened; each of said measuring cylinders being adapted, in traversing the other ports in said series to have its contents strengthened by fluid contact with the carbonated water in the other containers at higher pressures.

16. In a beverage dispenser, a supporting plate, a movable member having four measuring cylinders formed therein, means for moving said member in steps to cause said cylinders to repetitively traverse a fixed path, on said plate, three ports disposed along said path, each communicating with a different cylinder during the time said member is at rest between said steps, and a discharge port also disposed on said path and communicating with a different cylinder than the three aforesaid, said inlet ports each adapted to have a separate supply of carbonated water under pressure connected thereto whereby the supply connected to the port encountered by the cylinders after they leave said discharge port may deliver carbonated water thereto until it becomes exhausted following which the source connected to the second port encountered by the cylinders may deliver the water thereto.

17. In a beverage dispenser, a support, a cylinder and means to move the same in steps over a series of ports formed in said support, each of said ports being adapted to have an individual tank of carbonated water under pressure connected thereto, a spring loaded piston in said cylinder urged toward said support and the ports therein with a predetermined force; whereby, as the dispensing progresses the pressure of the first tank of said series encountered by said cylinder becomes reduced and is unable to fill the cylinder against said force, and whereby the complete filling of said cylinder may be effected by carbonated water at a higher pressure from the next tank in said series as said cylinder is stepped forward to communicate with another of said ports connected to said last tank.

18. In a dispensing machine, a positionable member having a series of vertical cylindrical cavities and a series of vertical companion cavities formed therein, a support, means to advance said member along a fixed path in predetermined steps on said support; a discharge nozzle on said support having joining passages therein, one of which has one of said cylindrical cavities in communication therewith when said member comes to rest at the end of each step, and the other of which has one of said companion cavities in communication therewith at the same time; fixed plate means contacting the upper surface of said member, whereby said member slides in contact with both said support and said plate means, said plate means forming a closure for the upper ends of said cylindrical cavities, means spaced apart from said nozzle for delivering carbonated water under pressure to said cylindrical cavities sequentially after each one is moved out of communication with said nozzle, and other means also spaced apart from said nozzle for delivering a non-carbonated liquid to said companion cavities after each one is moved out of communication with said nozzle.

19. In a beverage dispenser, a body member rotatably mounted on a shaft, a support plate in contact with one end of said member, a head plate in contact with the other end of said member, a plurality of measuring cylinders formed in said body, and having their ends closed by said plates, a plurality of auxiliary cylinders also formed in said body adjacent to and forming companion cylinders for said first cylinders, a plurality of stationary intake ports formed in said plate, a stationary discharge port also formed in said plate, means for arcuately advancing said body a distance substantially equal to the distance from the center of one of said cylinders to the center of the next, at least one of said intake ports being connected to a source of liquid under pressure, at least one syrup delivery port formed in said head plate and positioned on a path traversed by said auxiliary cylinders, said syrup port being connected to a supply of syrup, and a discharge nozzle in communication with said discharge port and also in communication with a companion cylinder whose main cylinder is at said discharge port.

20. In a beverage dispenser, a plate member forming a support, a shaft extending beyond one surface of said support, a body member rotatably mounted on said shaft in fluid tight relation to the surface of said support, a plurality of measuring cylinders formed in said body substantially equidistant from the center of said shaft, a spring loaded piston in each cylinder, means for advancing said body on said support in definite arcuate steps, a discharge port and a plurality of equally spaced intake ports formed in said plate and valved into communication with said cylinders by the movement of said body in said arcuate steps, said intake ports being connected to an equal number of sources of carbonated liquid under pressure, the steps of advance of said body at least coinciding with the positions of said ports, whereby cylinders filled with liquid from said intake ports have their pistons displaced by said liquid and may dispense said liquid via said discharge port under the urge of said pistons as said body is advanced.

JAMES E. STEWART.

REFERENCES CITED

The following references are of record in the file of this patent:

UNITED STATES PATENTS

| Number | Name | Date |
|---|---|---|
| 214,103 | Close | Apr. 18, 1879 |
| 370,613 | Fifield | Sept. 27, 1887 |
| 762,429 | Mauth | June 14, 1904 |
| 1,052,377 | Pindstofte | Feb. 4, 1913 |
| 1,065,793 | Ferber | June 24, 1913 |
| 1,364,889 | Rupp | Jan. 11, 1921 |
| 1,480,337 | Ayars | Jan. 8, 1924 |
| 1,650,151 | Patterson | Nov. 22, 1927 |
| 1,688,067 | Barry | Oct. 16, 1928 |